United States Patent [19]
Russell

[11] Patent Number: 5,090,335
[45] Date of Patent: Feb. 25, 1992

[54] TABLE FOR TRUCK BED

[76] Inventor: Kenneth R. Russell, 1270 N. Fowler Dr., Deltona, Fla. 32725

[21] Appl. No.: 235,202

[22] Filed: Aug. 23, 1988

[51] Int. Cl.⁵ ............................................. A47B 23/00
[52] U.S. Cl. .................................... 108/44; 296/24.1; 224/42.44
[58] Field of Search ............... 108/44, 55.1, 116, 127, 108/129, 132; 214/83.24; 224/42.44, 310, 42.42; 296/24.1, 37.1; 248/188.2, 188.6, 188.8

[56] References Cited

U.S. PATENT DOCUMENTS

| | | | |
|---|---|---|---|
| 2,471,780 | 5/1949 | Doerr | 108/44 X |
| 2,729,499 | 1/1956 | Eggum . | |
| 2,893,790 | 7/1959 | Ervine . | |
| 2,953,287 | 9/1960 | Werner | 224/42.44 |
| 2,982,578 | 5/1961 | Lowe . | |
| 2,995,398 | 8/1961 | Davenport . | |
| 3,058,636 | 10/1962 | Bilbeisi | 224/42.44 X |
| 3,338,620 | 8/1967 | Cauvin | 224/42.44 X |
| 3,554,595 | 1/1971 | Wolff . | |
| 3,559,826 | 2/1971 | Abromavage | 214/85 |
| 3,768,673 | 10/1973 | Nydam | 214/83.24 |
| 3,784,990 | 1/1974 | Elisofor et al. | 108/44 X |
| 3,915,492 | 10/1975 | Agnese | 296/23 C |
| 4,139,229 | 2/1979 | Cooper | 296/23 C |
| 4,494,465 | 1/1985 | Fick, Jr. | 108/44 |
| 4,567,835 | 2/1986 | Reese et al. | 249/188.8 X |
| 4,635,562 | 1/1987 | Kreeger | 108/55.1 |
| 4,685,857 | 8/1987 | Goeser | 414/522 |
| 4,733,898 | 3/1988 | Williams | 296/24.1 |

FOREIGN PATENT DOCUMENTS 2701786 7/1928 Fed. Rep. of Germany ..... 296/37.1

*Primary Examiner*—Jose V. Chen
*Attorney, Agent, or Firm*—Julian C. Renfro

[57] ABSTRACT

For use in the bed of a truck, a generally rectangular table approximately the size of the truck bed, and designed to normally repose in the truck bed. This novel table has a forward portion and a rearward portion, and a series of rollers on its underside such that when the truck has been parked, the table can be extended rearwardly to a desired extent from the bed of the truck. In the interests of providing stability to the table, the forward portion of the table can be readily caused to enter into a locking relationship with a rearward portion of the truck bed, such that the table can then serve, by virtue of its relationship to the truck, as a particularly stable means upon which detailed work can be conducted. This new table also has a series of hingedly mounted legs on its underside, which can be selectively utilized to provide ample support for the table when it has been deployed in a position in which it is at least partially extended from the bed of the truck.

10 Claims, 6 Drawing Sheets

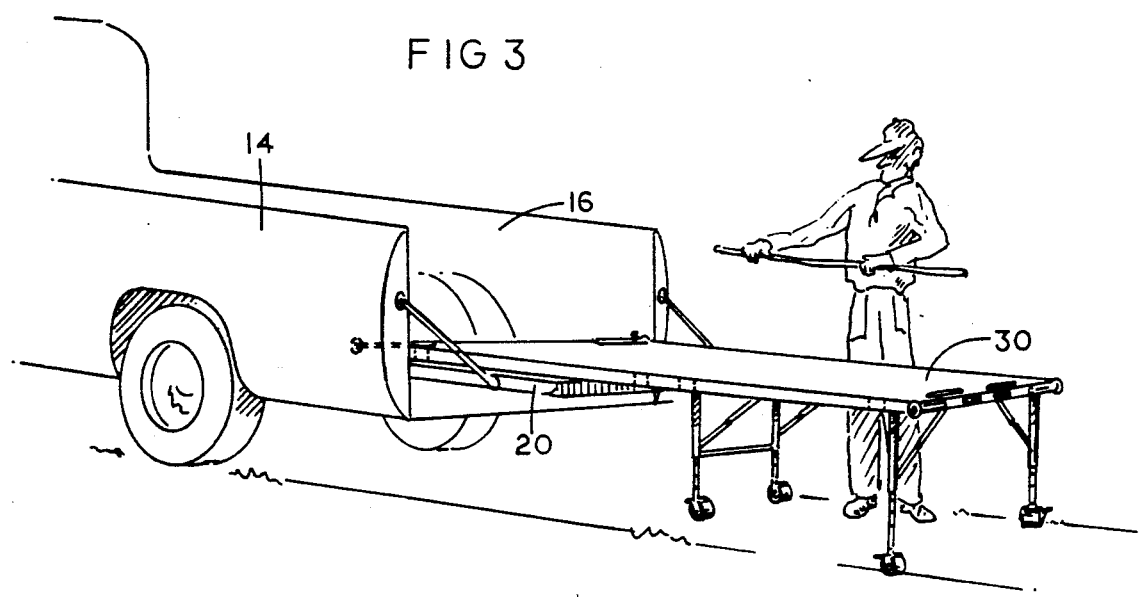
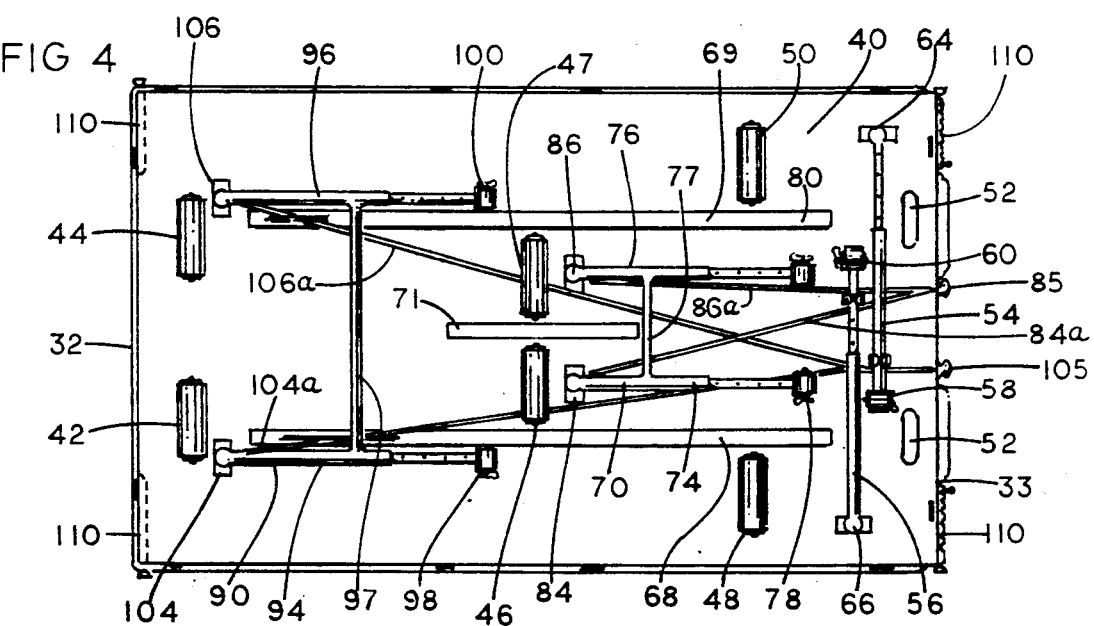
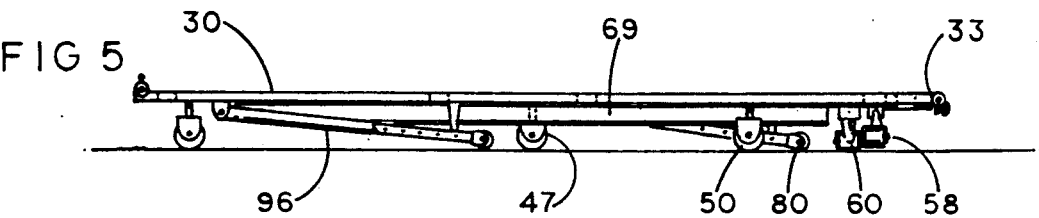

TABLE FOR TRUCK BED

BACKGROUND OF THE INVENTION

This invention relates to a slide out table for use on a pickup truck or the like, and more particularly to an extensible table adapted to effectively increase the utility of a small truck.

It has been common practice in the case of small trucks such as those commonly called "pickup" trucks to build a rack or superstructure which will provide a supporting framework for articles of unusual length such as ladders and scaffolding. Thus, contractors, painters, carpenters, bricklayers and construction workers in general, have felt the need of providing means in combination with a small truck for carrying long articles supported longitudinally of the truck.

A number of systems have also been developed for facilitating the placement and removal of freight articles on and from the load floor or bed of a truck. The full utilization of the space above the load floor usually requires a considerable amount of shifting of the articles from the rear to the front after they have been placed on the rear portion of the truck floor, either from ground level, or from a loading dock. Accessibility of particular freight articles within a large pile usually requires that enough space remain clear for the workman to move around and perform what amounts to a sorting operation. All of this space is, of course, wasted for purposes of carrying load.

One approach to this problem has been to assure a fairly free movement of articles in a front-to-rear direction through the use of roller-supported panels upon which freight articles are placed. Standard roller conveyors have been mounted on the floor of trucks for this purpose, with the load items being placed directly on large sheets of plywood. More sophisticated versions of this same general principle involve the use of load carriers supported on rollers engaging rails secured to the truck floor. Systems of this nature are analogous to the drawer-suspension mechanism frequently found in filing cabinets.

One problem associated with this type of device is the fact that rearwardly-extended positions of the platform result necessarily in a cantilever support of the load, which places a tremendous stress requirement on the portion of the structure which still remains engaged with the rails. When mechanism of this type is used in conjunction with a truck, a special problem exists in the fact that a loading dock will usually not be in alignment with the load carrier in the rearwardly-extended position, thus resulting in the need for some sort of auxiliary support for the extended portion of the structure, unless unduly heavy and expensive components are used which will sustain the cantilever supporting position.

It is the purpose of this invention to provide a highly effective, slidably mounted table for the bed of a truck, that overcomes these and other such problems.

SUMMARY OF THE INVENTION

The present invention provides a roll-out load-transfer platform for installation on a truck, in which the platform may be utilized at the rearward extremity of its movement as a support for the activities of a skilled tradesman or sportsman. In the latter position, the system is constructed such that the rearward portion of the truck can function as a stabilizing means for the extended table, so that upon the extension of its legs, the table can be used as a firm platform for the purposes of a carpenter, plumber, cabinet maker, do-it-yourselfer, or the like.

It is therefore to be seen that this invention relates to adjustable load-carrying apparatus for vehicles. My novel table may be mounted on an existing load-carrying bed of a vehicle, and utilized to facilitate vehicle loading and unloading. The adjustable apparatus is also useful to provide a convenient workbench for on-site service and repair work.

Others have heretofore proposed adjustable platforms of the slide or rollout type for loading vehicles; and others have also heretofore proposed a fixed platform above the standard load-carrying bed of a vehicle with ramp members lodged underneath the fixed platform but movable for the purpose of providing a sloped surface for driving a smaller vehicle, snowmobile or garden tractor up the ramp onto the fixed platform.

Insofar as is known, however, no one has heretofore figured out a way to provide not only a reliably strong adjustable platform assembly of roll out or slide out character, but also one smoothly slidably adjustable and firmly lockable in varied selected positions of adjustment; and in particular no one insofar as is known has provided such a platform assembly in a form additionally capable of carrying with it a ramp assembly useful to provide a sloped surface from ground level to the slide out platform at a variety of positions for the platform.

As will be seen at greater length hereinafter, this invention provides a rollout or slidable platform frame assembly of reliably strong structural relationship with respect to a base frame assembly and preferably also firmly lockable in a variety of selected positions of rollout or slidable adjustment. Optionally the slidable frame assembly may carry with it a ramp assembly extendable in a sliding manner therefrom to provide a sloped or inclined treadway or surface for rolling or driving or sliding a variety of vehicles or articles or objects from ground level onto the support or load-carrying platform surface of the slidable frame assembly.

Quite importantly, the assembly I prefer to utilize includes locking means that will provide stability for the table when it is extended into a selected position with respect to the bed of the truck. My novel apparatus also provides considerable convenience in the loading and unloading of articles from the load space of van-type vehicles and covered or uncovered pickup trucks.

The principal object of this invention is therefore to provide an extensible table adapted to be mounted on a vehicle such as a pickup truck, where the table will prove especially beneficial to carpenters, plumbers, and welders as well as to campers, huntsmen, or the like.

A further object of the invention is to provide a highly useful adjunct for a craftsman's vehicle in the form of a stable and versatile table, which is extremely simple and inexpensive to manufacture, and which can be used in a very effective manner by a wide variety of tradespeople.

It is a yet further object of my invention to provide a roll out table for the back of a pickup truck or the like, wherein the forwardmost edge of the table can be clamped to the sidewalls of the truck bed at any of a very wide number of selected locations, in order to achieve stability for the table when it is to be used in an extended position.

It is still another object of my invention to provide a slide out table having a plurality of extensible length legs on its underside, the lengths of which legs can be adjusted to level the table, despite the fact that the table may be used on uneven terrain.

It is yet still another object of my invention to provide a slide out table having a plurality of extensible length legs mounted on locking hinges, with cables provided on the underside of the table to permit the user to release the locking hinges from a convenient location, permitting the legs to drop, without the operator needing to get under the table to deploy the legs.

These and other objects, features and advantages of my invention will more fully apparent from the following description.

BRIEF DESCRIPTION OF DRAWINGS

FIG. 3 is a view somewhat similar to FIG. 2, but showing my no table having been moved to an extended position, after the legs have been deployed;

FIG. 4 is a view of the underside of my novel table, showing a preferred arrangement of the rollers, and the retractable of the table when the legs are in a folded condition;

FIG. 5 is an edge view relatable to FIG. 4, with the folded legs, the rollers, and other aspects of the underside of my table being visible;

DETAILED DESCRIPTION

Figure 1:
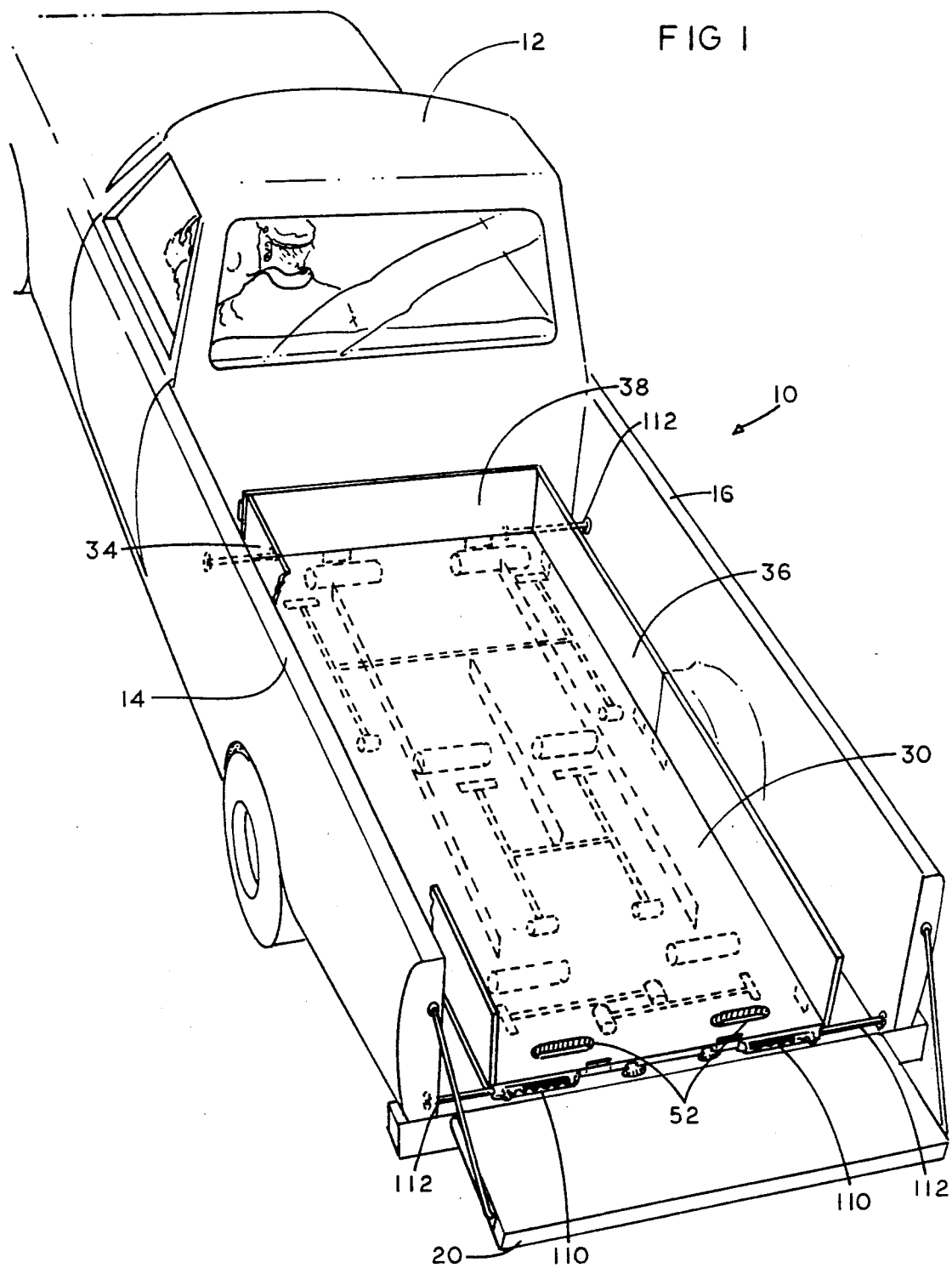
FIG. 1 is a perspective view of the rear portion of a typical pickup truck, illustrating my novel table equipped with low height boundary members, and disposed in the stored position.

With initial reference to FIG. 1, it is there to be seen that I have shown an open bed truck 10 of typical construction, of a type commonly referred to as a pickup truck. In the conventional manner, this truck has a cab 12, sides 14 and 16, and a bed 18. At the rear end of the bed is a conventional hinged tailgate 20, which is horizontal when in the lowered position, and vertical when in the closed position in which it contacts the rearmost edges of the sides 14 and 16.

Figure 2:
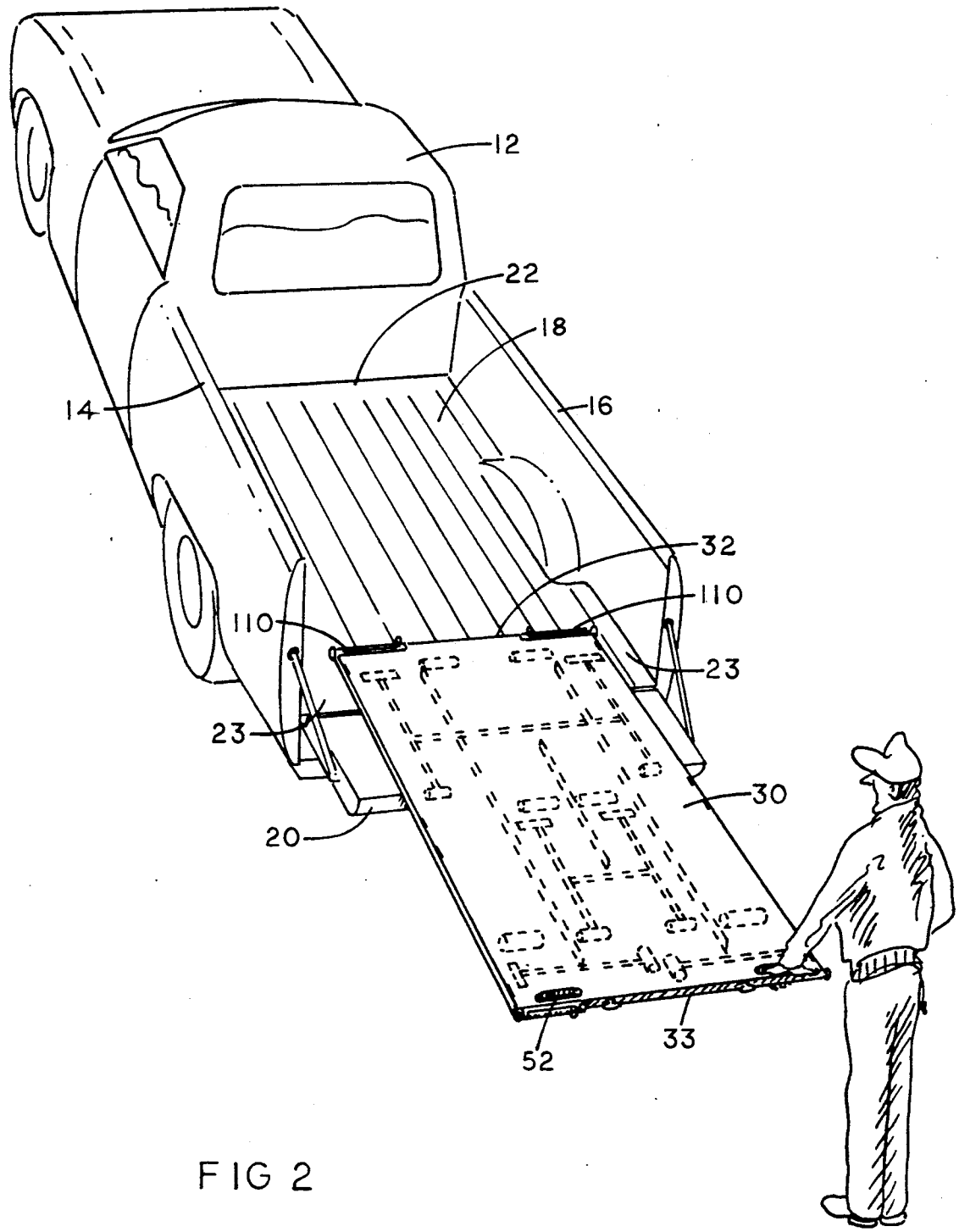
FIG. 2 is a view similar to FIG. 1, but showing the truck parked, and my novel table with boundary members removed, the table here having been moved to an extended position, without the legs having been deployed.

In accordance with this invention I have shown a table 30 of sturdy construction, equipped with a series of rollers on its underside, and in FIG. 2 my novel table is shown deployed in its extended position. The table 30 may for example be made of plywood, of a tough plastic, or even of a lightweight metal such as aluminum sheet.

When extended, the table is supported by a plurality of legs, hingedly attached on the underside of the table in a manner discussed at greater length hereinafter, but in FIG. 2, the legs have not as yet been deployed.

My table 30 has a flat upper surface, and is designed for convenient use by workmen and sportsmen alike, particularly when in the extended position illustrated in FIG. 3, with the legs locked in their extended positions, and with the forwardmost edge 32 of the table in contact with the rearwardmost edge 23 of the bed 18.

When in the operative position shown in FIG. 3, the table 30 is able to be effectively utilized by carpenters, cabinet makers, plumbers, welders, and other skilled tradesmen, as well as by sportsmen of many types.

It is to be seen in FIG. 1 that I may provide boundary members of relatively short height around the forwardmost portion of the table 30, with this figure revealing that this includes a member 34 on the left, a member 36 on the right and a center boundary portion member 38. The left and right edges of the center boundary member 38 are firmly secured to the forwardmost edges of the side members 34 and 36, respectively, such as by the use of locking pins.

I prefer for each boundary member to have a plurality of downwardly extending members located at preestablished locations along its lower edge, with such downwardly extending members arranged to be received in appropriate slots placed at corresponding locations around the peripheral edges of the table. Such slots are indicated in FIGS. 1, 2 and 4, and in FIGS. 8a and 8b, for example.

It should be apparent that by inserting the lowermost edge of each such vertical member into the corresponding slot in the table edge, the boundary members can be retained in their respective operative positions on the table member.

Figure 6:
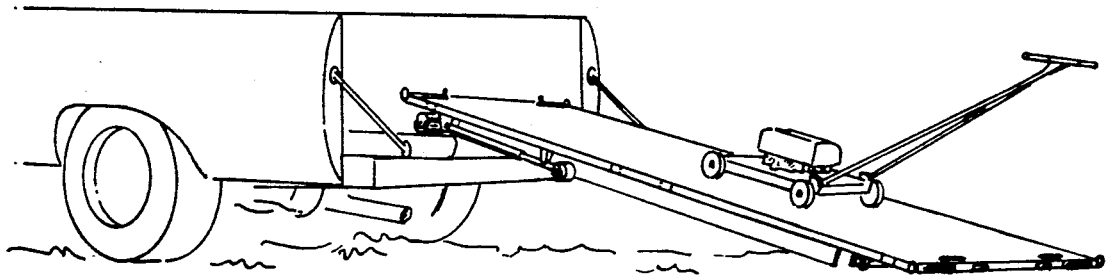
FIG. 6 is a perspective view showing my novel table being used as a ramp, such that a power mower or the like can be moved to or from the truck bed, without having to be lifted by the user.
Figure 6A:
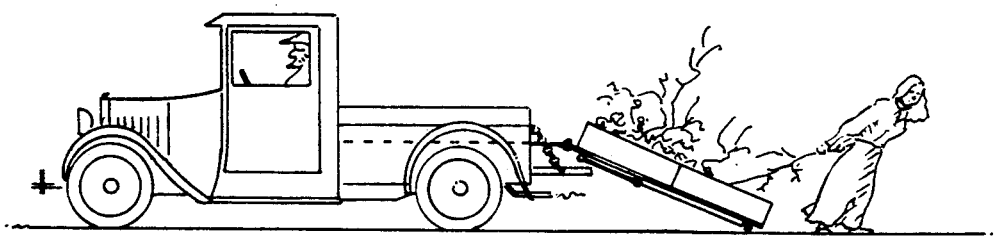
FIG. 6a is a side elevational view somewhat in the nature of FIG. 6, but showing how my table can be used for the removal of trash or cuttings from the truck bed.

As is obvious, these boundary members effectively prevent short items carried on the table from slipping off the table onto the bed 18 of the truck 10 at such time as the table 30 is pulled rearwardly to the extended position illustrated in FIGS. 2 and 3. The use of these short boundary members is optional, and in the embodiments of FIG. 1 and 6a, usage of such members is shown, whereas in other figures the boundary members are eliminated.

As will be seen hereinafter in FIG. 10, side members of substantial height can also be installed on my table, with the aforementioned slots in the periphery of the table enabling the vertical members associated with the side members to be received, thus to provide stability to the sidewalls or boundary members, and prevent undesirable displacement thereof.

Figure 7:
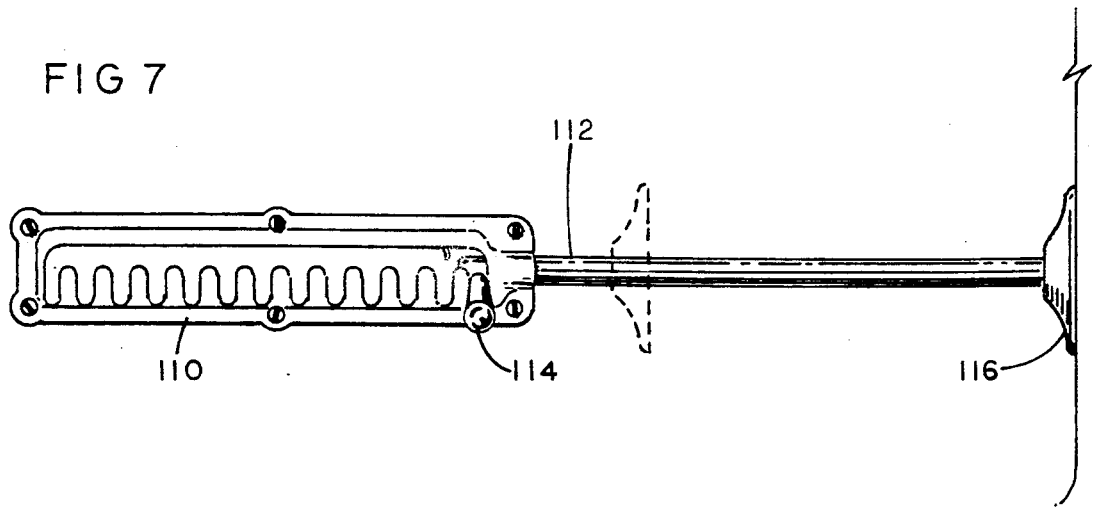
FIG. 7 is a view of a typical member used adjacent the four corners of a table, for causing the table to be "locked" in a selected with respect to the bed of the pickup truck.

It is to be understood that when the table 30 is in its travel position, with its legs still folded, and tailgate 20 in the lowered position, long items such as a ladder, boards, lengths of pipe, and the like can be readily carried. Although I typically maintain the tailgate 20 in the closed position when the truck is underway, in which the tailgate will serve to prevent short items such as tool boxes, cartons, barrels and the like from falling off the table while the truck is moving, it is quite possible for the workman or sportsman to safely travel with the tailgate down. This is because I utilize means on the front and rear edges of the table 30 to effectively prevent the table from rolling off of the bed 18, even when the truck may be traveling at high speed. Such means are illustrated in FIG. 7, and will be discussed hereinafter.

In FIG. 3, I show the table with its legs extended into the table-supporting position, with a toggle type locking member of the type commonly used on folding card tables extending diagonally between the underside of the table and each leg, for holding each leg in perpendicular relationship to the underside of the table. Instead of the toggle type locking members shown in FIG. 3 being used, however, I can instead use locking hinges, as will hereinafter be discussed, or I can use both the locking hinges and the toggle type locking members for each leg.

In FIG. 4 I depict the underside or bottom surface 40 of the table 30 in considerable detail in order to reveal the novel leg arrangement I prefer to utilize. The forwardmost edge 32 of the table is shown on the left in FIG. 4, whereas the rearmost edge 33 of table 30 is depicted on the right.

When considering the underside 40 of the table as depicted in FIG. 4, it is to be noted that I utilize a roller 42 on the front left of the underside of the table, and a roller 44 on the front right. In addition, I utilize a pair of center rollers 46 and 47 as well as a roller 48 on the left rear, and a roller 50 on the right rear. When viewed from the flat upper surface of the table 30, there is, of course, a left for right reversal of these positions, and in FIGS. 1 and 2, the rollers, legs, and other components are accordingly shown in dashed lines rather than full lines. As will be discussed hereinafter, in FIG. 11 I show to a comparatively large scale, a locking type roller of the style that may be suitable for use on the underside of my table.

Because of the use of the rollers 42 through 50, it is readily possible for a workman or sportsman to move the table rearwardly on the bed 18 of the truck to a desired deployed position, and after its use, it is easy for him to move the table back to the stored position. For the convenience of the craftsman or sportsman, I utilize a pair of handles 52 closely adjacent the rearwardmost edge 33 of the table, which in the preferred instance are a pair of cutouts.

To give sturdiness and rigidity to the table in instances in which it may be used as a ramp, for example, I prefer to use a pair of longitudinal structural members 68 and 69 on the underside of the table. These members are typically metal, and of a cross sectional configuration selected to resist bending as much as possible. The strengthening members are typically screwed or bolted to the underside of the table, at locations each side of the longitudinal centerline of the table, and essentially parallel thereto. The structural members 68 and 69 may each be of a length to extend within a foot or so of the front and rear ends of the table. A structural member 71 may be disposed on the longitudinal centerline of the table.

To permit the table 30 to be stably supported on the ground when it is in its extended position, I provide a number of legs that are hingedly attached to the underside of the table, as are to be seen in folded condition in FIG. 4. I prefer the use of locking hinges for attaching the folding legs to the underside of the table, such that the legs will remain upright when the table is set up for use, and remain folded until they are ready for use. These hinges will be discussed at greater length hereinafter. Quite importantly, these legs are of a length appropriate to cause the upper surface of the table 30 to be parallel to, and of the same height as the surface of the bed 18 of the truck (if such be desired) when the table has been moved to the extended position, and with the legs deployed, and locked.

Because of special needs that may arise, or because of the possibility that the truck may be parked at locations where the ground is uneven or rocky, I prefer for all of the legs mounted on the underside of my table to be extensible, such that the length thereof can be readily changed by the user of the table. This may be accomplished by having approximately the upper half of each of the legs of somewhat larger diameter than the lower half, such that each pair of leg halves are in telescopic relationship. A series of holes, typically in an evenly spaced relationship, are located in each of the lower leg portions, such that a bolt or pin may reside in a desired pair of aligned holes, to in effect lock the lower leg half to the upper leg half; note FIG. 9, for example. The bolt or pin passing through the selected pair of holes in the lower leg typically also extends through a pair of holes in the upper leg portion, so that the leg can be expected to maintain the selected overall length. Because of this arrangement, the user can have all the legs of the table of the same length, or he can have the effective length of some legs greater than the effective length of the other legs, in order to achieve a certain slant to the table if for some reason such is desired, or so as to bring about table levelness in a location of uneven ground, for example.

Continuing with FIG. 4, the legs on the underside 40 of table 30 include a rearmost leg 54, immediately adjacent which leg is leg 56, with the leg 56 being substantially parallel to the leg 54. These legs are mounted in what may be regarded as an opposed relationship, extending in a left-right direction, with a hinge member 64 being provided at the far right edge (outboard portion) of leg 54, so as to form a firm attachment of the upper end of leg 54 to the underside 40 of the table 30. Likewise, a hinge member 66 is provided at the outboard edge of leg 56, so as to attach the leg 56 strongly to the underside 40 of table 30. The legs 54 and 56 near the rearward portion of the table are thus to be seen to be mounted so as to fold in a lateral or right-left direction.

It is to be noted that a caster 58 is provided on the opposite end of leg 54 to the hinge 64, and a caster 60 is provided on the opposite end of leg 56 from its hinge 66, so as to simplify movement of the legs and the table with respect to the ground when the truck has been stopped, the table extended, and the legs deployed.

Importantly, the casters 58 and 60 are of the locking type, so after the workman or sportsman has moved the table 30 to the desired position, he deploys and locks the legs, and moves the casters to their locking positions.

Figure 11:
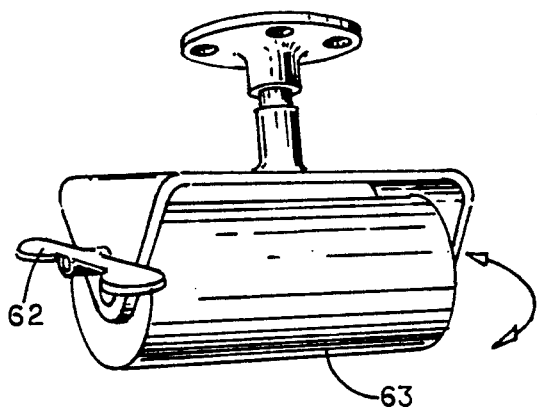
FIG. 11 is a view of a locking roller or caster in accordance with this invention, having means for locking, on occasion, the horizontally disposed roller against rotation.

Although I am not to be limited to any particular style of locking caster, I prefer to use the type of locking caster as depicted in FIG. 11, wherein a pivotally mounted member 62 is disposed at one end of the roller member 63 or caster. When the user steps on one end of the pivotally mounted locking member 62, the roller is locked against rotation, whereas when the user steps on the other end of the pivotally mounted member, the locking action is eliminated, and the roller 63 is free to turn about its axis. By the use of locking rollers or casters, undesired shifting of the table while it is being used in its extended position is effectively minimized, if not entirely prevented. Because the caster depicted in FIG. 11 may be turned freely about its vertical mounting, it is to be realized that the rollers on the underside of my table have 360 degrees of freedom about their vertical axis, thus permitting the user to move the table freely, when the occasion warrants.

Returning to FIG. 4, it is to be noted that approximately in the center of the underside 40 of the table 30 is a leg member 70 approximately of "H" configuration, with leg member 74 residing below and parallel with leg member 76 as viewed in FIG. 4, with a cross brace 77 extending between upper portions of the legs 74 and 76. It is to be noted that the leg 74 is inboard of the roller 48, and the leg 76 is inboard of the roller 50.

FIG. 4 reveals that leg 74 is equipped with a caster 78, and leg 76 is equipped with a caster 80, and again, I prefer to utilize casters of the locking type in order to minimize if not entirely prevent undesirable shifting of the table in a fore and aft or in a left and right manner when the table is being utilized in its extended position, largely supported by its legs.

As will also be noted from FIG. 4, hinge 84 serves as the forward support for leg 74, and hinge 86 serves as the forward support for leg 76, with of course one part of each hinge being securely fastened to the the underside 40 of the table 30. The provisions of these hinges makes it readily possible for the workman or sportsman to readily move the legs 74 and 76 between folded and extended positions. I prefer the use of locking hinges, and when such are used, cables 84a and 86a extend between the locking hinges and the rearmost edge 33 of the table, in order to permit the user to readily release the hinges from the locked positions from a convenient location. For example, handle 85 is provided at the rear edge 33 of the table, for the convenience of the operator in pulling the cables 84a and 86a at the appropriate time.

It is important to realize that the hinges 84 and 86 are affixed to the forwardmost ends of the legs 74 and 76, rather than from the rearmost ends of the legs, for in this way, if the workman or sportsman has forgotten to fold these legs flat against the underside of the table at the time the table is to be moved to the stored position, the contact of a midportion of these legs with the rearwardmost edge 23 of the truck bed 18 during forward table movement will ca use the legs to automatically move about their hinges into the appropriate position for storage.

In a like manner, I utilize a leg member 90 of "H" configuration forward of the leg member 70, with leg member 90 typically being of wider span than leg member 70. Leg member 90 is principally made up of leg 94 and leg 96, which are preferably parallel, with a cross brace 97 extending between the upper portions of the legs. I prefer to utilize a caster 98 on the bottom of leg 94 and a caster 100 on the bottom of leg 96. As in the case of the other legs, I prefer for these to be locking casters. As previously mentioned, the locking casters may be of the type depicted in FIG. 11.

The leg 94 is preferably attached to the underside 40 of the table by means of a hinge 104, and leg 96 is attached to the underside 40 by means of a hinge 106. By virtue of this arrangement, the H-shaped leg member 90 can readily be moved between a locked folded position, and a locked extended position. As in the case of leg member 70, I prefer to utilize these hinges at the forwardmost portions of legs 94 and 96, for in this way, if the workman or sportsman has forgotten to fold these legs flat against the underside of the table at the time the table is to be moved to the stored position, the contact of these legs with the rearwardmost edge 23 of the truck bed 18 during forward table movement will cause the legs to automatically move about their hinges into the appropriate position for storage.

As in the case of the hinges associated with leg member 70, the hinges 104 and 106 used with legs 94 and 96 are of the locking type, with cables 104a and 106a extending from these hinges to the handle 105 located at the rearmost edge 33 of the table. This arrangement of course permits the operator, by pulling the handle 105, to unlock the hinges at the time he is withdrawing the table from the bed of the truck, with such unlocking of the hinges enabling the legs 94 and 96 to drop, under the influence of gravity, away from contact with the underside of the table.

It is to be noted that the leg member 90 is wider in the left-right direction than the leg member 70. This is because in the preferred embodiment, there are no rollers outboard of the legs 94 and 96.

It is to be noted that irrespective of the fact that I utilize means for locking the legs in the extended position, and employ locking casters on the bottom of the legs of my table, such as of the type depicted in FIG. 11, the user of the table may find that the table is a bit unstable, and tend to rock somewhat at such time as a carpenter or other craftsman endeavors to use the table in the construction or repair of certain devices. Accordingly, I prefer to utilize a clamping means at the four corners of the table, such as of the type depicted in FIG. 7, in order that the table can be selectively "locked" to the sidewalls of the truck bed. In that way, the entire body of the truck serves as a stabilizing influence for the table, thus permitting the user of the table a much more stable platform from which to conduct various constructional or repair operations, than if the table were utilized in a freestanding mode.

By an inspection of FIG. 7 it will be seen that the preferred means I utilize for selectively clamping the table to the sidewalls of the truck at the desired location takes the form of a notched base member 110, and a slider member 112. One of the notched base members 110 is secured on each side of the rearmost edge 33 of the table 30, as seen in full lines in FIGS. 1 through 4, and as shown in dashed lines on the forwardmost edge 32 of the table in FIG. 1.

The slider member 112 of the clamping means as shown in FIG. 7 is slidably received in base member 110, with the slider member 112 having a handle 114 thereon at one end. On the end of each slider member opposite the handle is a member 116 of comparatively soft, resilient material, selected for its ability to contact the inner sidewalls of the sides 14 and 16 of the truck without scratching or otherwise damaging the integrity or the appearance of the truck sidewalls. The member 116 may even be in the form of a large suction cup, that will grip the inner sidewall of the truck without slippage at such time as the member 112 has been slid as far as it would go in the direction of the closest truck sidewall. An elongate passageway or slot is formed in the base member 110 above the numerous aligned slots, along which passageway the handle 114 on each side of the table is freely movable. Thus, when the truck has been parked, and the slider member 112 of each base member 110 has been moved outboard as far as it will go, the respective handle 114 of each slider member is moved into contact with the slot in the respective base member 110 that will best serve to maintain the table in a tightly locked condition, in a left-right sense, with respect to the sidewalls of the truck bed. This of course quite effectively prevents the table from undesirably shifting position in the truck bed.

I preferably utilize a clamping means of the type shown in FIG. 7, or a similar suitable type of clamping means, at each corner of the table, but most importantly, I utilize suitable clamping means at each side of the forwardmost edge 32 of the table, so that the table can be securely yet removably affixed to the rear portion of the sides 14 and 16 of the truck bed at such time as the craftsman or sportsman wishes to stabilize the extended table against undesired movement during use.

As should now be apparent, the respective slider members 112 can readily be moved in the outward direction into firm sidewall contact by the welder, plumber, carpenter or whoever is using the table, thus to bring about a much steadier table, and therefore a much more desirable location in which to work. The handle 114 of each slider member is to be inserted into the notch in the base member 110 that will best maintain the table in a suitably locked, stabilized position.

Likewise, by later lifting each handle 114 away from contact with the notch utilized for clamping the table in the stabilized condition, the operator can easily slide the slider member 112 in the direction away from the truck bed sidewall so as to release the sidewall-engaging member 116 of each slider member of the clamping means from the operative position. This being done, the operator can readily return the table to the stored condition in the truck bed, after which he should place each handle 114 again in a notch that will bring about clamping of the table to the truck sidewalls, this of course being done to minimize the tendency of the table to shift during the time the table is being transported by the truck from job location to job location.

Figure 8A:
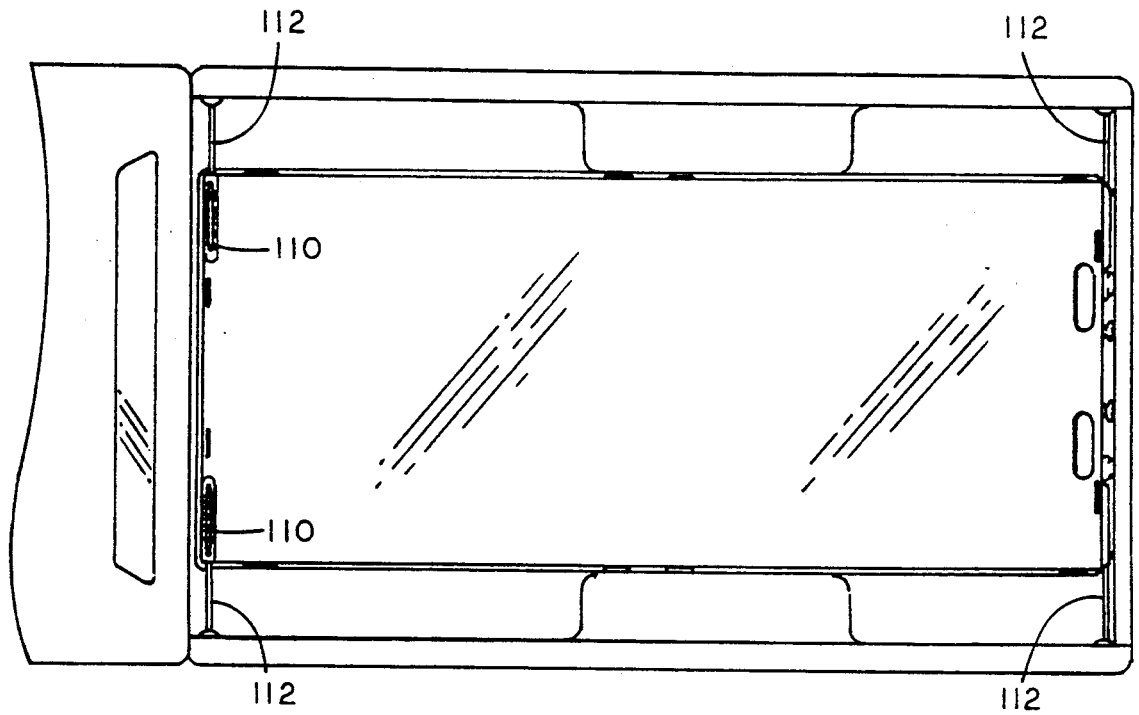
FIG. 8a is a view of the comparatively narrow width table that is able to be accommodated in the back of a truck in which wheel wells extend into the truck bed area.
Figure 8B:
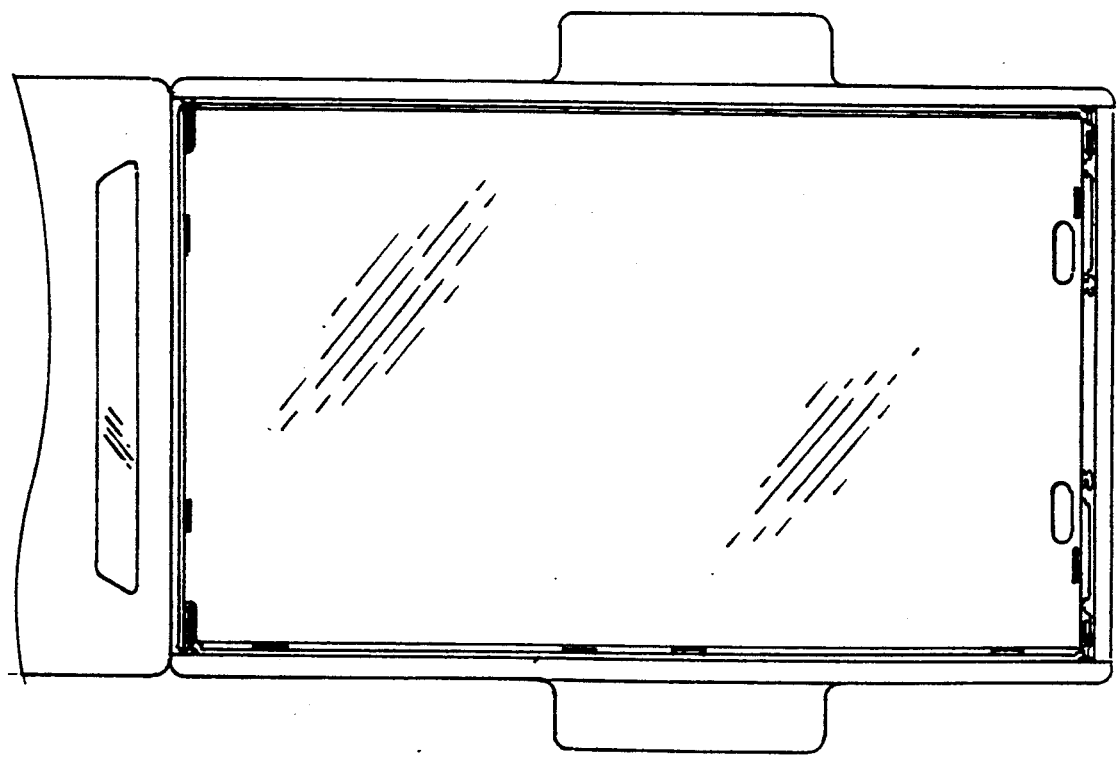
FIG. 8b is a view of a table somewhat wider than the table depicted in FIG. 8a, with this larger size being possible because wheel wells in this instance do not intrude into the truck bed area.

As is obvious from comparing FIG. 8a with FIG. 8b, the laterally extensible clamping devices 110-112 need to be considerably longer in accordance with the embodiment of FIG. 8a, so that the extensible clamping devices on the forwardmost edge 32 of the table can reach the sidewalls of the truck aft of the wheel wells, where there is a marked difference in the width of the table, and the spacing of the sidewalls of the truck bed.

Figure 9:
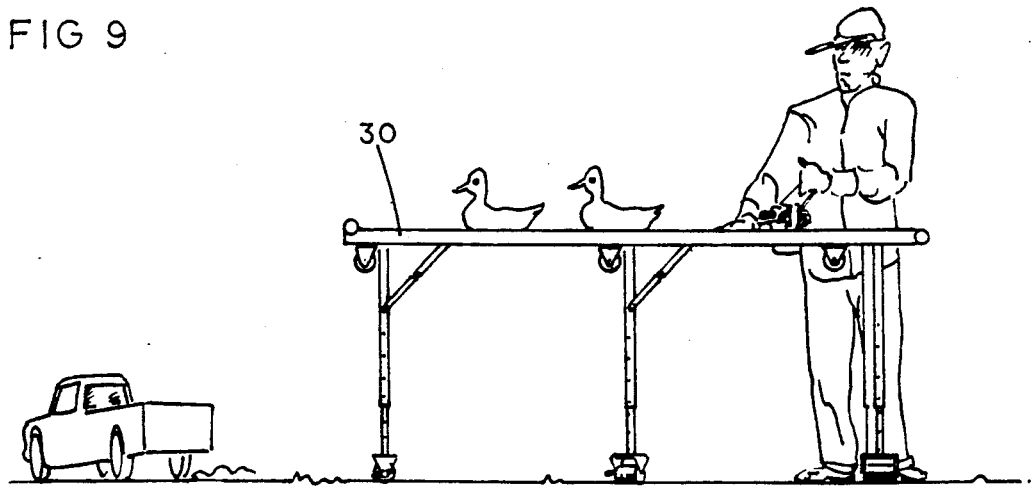
FIG. 9 is a view of my table after it has been set up for use at a location remote from the truck, with the legs having been locked in their extended positions, and the rollers on the bottoms of the legs having been locked against undesired rotation.

In FIG. 9 I reveal that a table in accordance with my invention may be effectively used entirely apart from the truck, for the leg-locking arrangement and the locking casters I preferably use contribute considerably to the table having a degree of stability acceptable for many light duty purposes.

Figure 10:
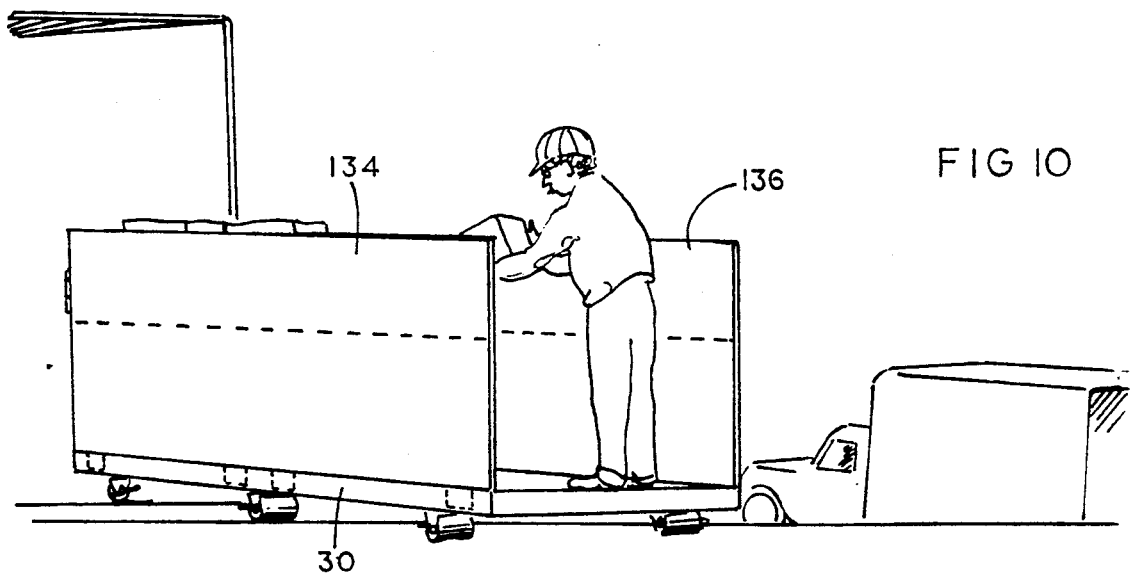
FIG. 10 is a view of my table after high sides have been installed thereon, such that a number of cartons or boxes can be stacked on the table without fear of such cartons or boxes falling off.

In FIG. 10 I reveal the use of my table with sides or walls of substantial height, with the front edges of the left side member 134 and the right side member 136 preferably being pinned or otherwise secured to the front wall member (not shown). This figure thus reveals that my novel table can be used as a cargo bin on a loading dock, for example, and after being fully loaded with boxes, packages or the like, it can readily be pushed into the bed of the truck with which it is being used. As is obvious from FIG. 10, the truck may have high sides and a roof, and need not be a pickup truck.

It should now be clear that in accordance with this invention I have provided a highly effective, well designed table for use in the bed of a truck, for example, with a number of features used thereon that contribute to the versatility of the table, and its ability to be used for a variety of purposes. When a table having a high degree of stability is needed, the ability of my table to be clamped tightly between the sidewalls of the truck becomes a significant factor in its use. As is obvious, only those legs of the table that the workman or operator desires to have in contact with the ground are used in each instance.

I claim:

1. For use in the bed of a truck, a generally rectangular table approximately the size of the truck bed, and designed to normally repose in the truck bed, said table having a forward portion and a rearward portion, and locking means thereon, and a series of at least four rollers on the underside of said table, that are disposed in spaced apart, symmetrically placed locations in contact with the bed of the truck, thereby to provide a distributed support for said table, such that when the truck has been parked, the table can be rolled rearwardly to a desired extent from the bed of the truck, to a location at which the forward portion of said table can be readily caused to enter into a locking relationship, by the use of said locking means, with a rearward portion of said truck bed, such that the table can then serve, by virtue of its relationship to the truck, as a particularly stable means upon which detailed work can be conducted, said table also having a series of hingedly mounted legs on its underside, to provide ample support for said table when said table has been deployed in a position in which it is at least partially extended from the bed of the truck.

2. The generally rectangular table as recited in claim 1 in which said table can be moved to any of a wide variety of distinct positions with respect to the truck bed, and locked in any of such positions.

3. The generally rectangular table as recited in claim 1 in which locking means are provided such that said hingedly mounted legs can be locked in either their folded positions or their deployed positions.

4. The generally rectangular table as recited in claim 3 in which said hingedly mounted legs can be unlocked from their folded positions from a location adjacent the rearmost edge of the table.

5. The generally rectangular table as recited in claim 1 in which a locking caster is utilized at the bottom of each of said legs.

6. The generally rectangular table as recited in claim 1 in which the legs located at the forward portion of said table are hinged to fold in the rearward direction at such time as the user pushes the extended table toward the front of the truck, whereas at least one pair of legs near the rearward portion of said table are mounted so as to fold in a lateral direction.

7. The generally rectangular table as recited in claim 1 in which strengthening members are utilized in a longitudinally disposed arrangement on the underside of said table, to give resistance to bending if said table has been substantially withdrawn from the truck bed, and is being used as a ramp.

8. The generally rectangular table as recited in claim 1 in which boundary members are utilized around several edges of said table, to prevent items stored on said table from falling off said table.

9. The generally rectangular table as recited in claim 1 in which wheels are mounted on the bottom of each of said legs, with the wheels of said legs being at the same level, when said legs have been folded, as said rollers on the underside of said table.

10. The generally rectangular table as recited in claim 9 in which means are provided for locking each of said wheels and rollers.

* * * * *